3,413,331
SULFATION OF A MIXTURE OF PRIMARY
AND SECONDARY ALCOHOLS
Arthur L. Beiser, Jackson Heights, N.Y., and Peter Leenders, Allendale, N.J., assignors to Standard Chemical Products, Inc., Hoboken, N.J., a corporation of New Jersey
No Drawing. Continuation-in-part of applications Ser. No. 443,064, Mar. 26, 1965, and Ser. No. 508,598, Nov. 18, 1965. This application Jan. 26, 1966, Ser. No. 523,036
11 Claims. (Cl. 260—458)

ABSTRACT OF THE DISCLOSURE

A process of direct sulfation comprising the steps of reacting a mixture of (1) from about 0.15 to about 0.9 mol equivalents of an alcohol selected from the group consisting of a polyethylene glycol alkyl ether, where the alkyl is derived from a primary alcohol, and a polyethylene glycol alkylaryl ether, and (2) from about 0.1 to 0.85 mol equivalents of an alcohol selected from the group consisting of a secondary alkanol and a secondary alkanol ethoxylate, with about 1 mol equivalent of anhydrous chlorosulfonic acid and recovering a mixture of sulfated alcohols having a sulfation degree of at least 80%.

---

This application is a continuation-in-part of our co-pending application Ser. No. 443,064 filed Mar. 26, 1965, and Ser. No. 508,598, filed Nov. 18, 1965, both now abandoned.

This invention relates to a process for the direct sulfation of mixtures of primary alcohol polyethers and secondary alcohols or secondary alcohol polyethers with chlorosulfonic acid. It also relates to a method of producing mixtures of primary alcohol polyethers and secondary alcohol polyethers and the product.

Methods of sulfation of primary alcohols have previously been reported. However, direct sulfation of compounds having a secondary hydroxyl group or a secondary alcohol polyether are difficult to perform with good yields. When effecting this reaction using sulfating agents having a stronger action than concentrated sulfuric acid, at the most an excess of 0.3 mol of the sulfating agent can be utilized. This reaction, therefore, takes a long time and the yields are low. If greater amounts of sulfating agent are utilized adduct formation occurs in the presence of the polyethers. Moreover, direct sulfation of secondary alcohols with sulfating agents causes hydrolysis of the sulfated material.

It is also known that addition products of dioxane, pyridine, alkyl ethoxylates, dialkyl ethers and polyglycol ethers with chlorosulfonic acid or sulfur trioxide can be used as mild sulfating agents to sulfate alcohols, both primary and secondary and also polyether alcohols. However, the sulfated products are contaminated with the ether adduct base, such as dioxane, etc. which do not contribute to the performance of the sulfated alcohols and result in increased costs of the sulfated alcohols. Even if an adduct of chlorosulfonic acid with a polyoxyethylated alcohol is employed as sulfating agent as proposed in United States Patent 2,771,484, where the final product of adduct breakdown is a sulfated alcohol ethoxylate which does contribute to the performance of the final sulfated mixture, certain drawbacks are encountered. Particularly, many steps must be employed to first produce and isolate the adduct and thereafter to effect the sulfation of the alcohol.

In the industrial production of alcohol polyether sulfates it is preferable to produce a product which has a high degree of neutralized organic sulfates and a low amount of inorganic salts.

It is an object of the present invention to develop a process of direct sulfation of a mixture of primary alcohol polyethers and secondary alcohols or secondary alcohol polyethers with chlorosulfonic acid to produce a concentrated mixture of alcohol sulfates having a sulfation degree of 80% or higher.

Another object of the present invention is the development of a process of direct sulfation which comprises the steps of reacting a mixture of (1) from about 0.15 to about 0.9 mol equivalents of an alcohol selected from the group consisting of a polyethyleneglycol alkyl ether of the formula

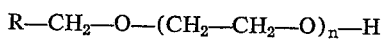

$$R-CH_2-O-(CH_2-CH_2-O)_n-H$$

wherein R represents a member selected from the group consisting of alkyl having from 5 to 19 carbon atoms, alkenyl having from 5 to 19 carbon atoms, and hydroxyalkyl having from 5 to 19 carbon atoms and $n$ represents an interger of from 2 to 17 and a polyethyleneglycol alkylaryl ether of the formula $$R'-O-(CH_2-CH_2-O)_n-H$$

wherein R' represents alkylaryl having from 7 to 24 carbon atoms and $n$ represents an integer from 2 to 17, and (2) from about 0.1 to 0.85 mol equivalents of an alcohol selected from the group consisting of alcohols of the formula

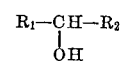

$$R_1-CH-R_2$$
$$\phantom{R_1-C}|$$
$$\phantom{R_1-CH-}OH$$

wherein $R_1$ and $R_2$ are alkyl having from 1 to 18 carbon atoms and the total of the carbon atoms in $R_1$ and $R_2$ is from 5 to 19, and secondary alcohol ethoxylates of the formula

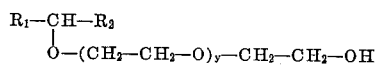

$$R_1-CH-R_2$$
$$\phantom{R_1-}|$$
$$\phantom{R_1-}O-(CH_2-CH_2-O)_y-CH_2-CH_2-OH$$

wherein $R_1$ and $R_2$ are alkyl having from 1 to 18 carbon atoms and the total of the carbon atoms in $R_1$ and $R_2$ is from 5 to 19, and $y$ is an integer of from 0 to 20, with from about 0.9 to about 1.25 mol equivalents per hydroxyl groups of anhydrous chlorosulfonic acid, at a temperature of from about 0° C. to about 50° C., and recovering a mixture of sulfated alcohols having a sulfation degree of at least 80%.

A further object of the invention is the development of a process for the production of a mixture of sulfated alcohols having a sulfation degree of at least 80% which consists of the steps of reacting from about 0.9 to about 1.25 mol equivalents per hydroxyl group of anhydrous chlorosulfonic acid with a mixture of (1) from about 0.15 to about 0.9 mol equivalents of a polyethylene glycol alkyl ether of the formula $$CH_3(CH_2)_x-CH_2-O-(CH_2CH_2O)_n-H$$

wherein $x$ represents an integer of from 4 to 18 and $n$ represents an integer of from 2 to 17 and (2) from about 0.1 to 0.85 mol equivalents of a secondary alcohol ethoxylate of the formula

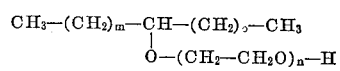

$$CH_3-(CH_2)_m-CH-(CH_2)_o-CH_3$$
$$\phantom{CH_3-(CH_2)_m-}|$$
$$\phantom{CH_3-(CH_2)_m-}O-(CH_2-CH_2O)_n-H$$

wherein $m$ is an integer of from 0 to 17, $o$ is an integer of from 0 to 17 and the sum of $m+o$ is an integer of from 3 to 17, and $n$ is an integer of from 2 to 17, at a temperature of from about 0° C. to about 50° C., neutralizing said reaction product with an aqueous solution of an alkali selected from the group consisting of ammonia, alkali metal hydroxides, alkyl amines, alkanol amines, propyloxylated amines, ethoxylated amines, polyamines and ethoxylated polyamines, and recovering a solution of neutralized mixed sulfated alcohols having a sulfation degree of at least 80%.

A yet further object of the invention is the development of a process for the production of a mixture of primary alcohol polyethers and secondary alcohol polyethers containing unreacted alcohols which comprises the steps of reacting one mol of a mixture of (1) from about 0.15 to about 0.9 mol equivalents of a primary alcohol of the formula $$R-CH_2-OH$$

wherein R represents a member selected from the group consisting of alkyl having from 5 to 19 carbon atoms, alkenyl having from 5 to 19 carbon atoms, and hydroxyalkyl having from 5 to 19 carbon atoms, and (2) from about 0.1 to 0.85 mol equivalents of a secondary alkanol of the formula $$R_1-CH-R_2$$
$$\phantom{R_1-C}\vert$$
$$\phantom{R_1-C}OH$$

wherein $R_1$ and $R_2$ are alkyl having from 1 to 18 carbon atoms and the total of the carbon atoms in $R_1$ and $R_2$ is from 5 to 19, with from 2 to 17 mols of ethylene oxide in the presence of an acidic catalyst at a temperature below ambient temperature, and recovering a mixture of primary alcohol polyethers and secondary alcohol polyethers containing unreacted alcohols.

These and other objects of the invention will become more apparent as the description proceeds.

It has now been discovered that secondary alcohols and secondary alcohol ethoxylates may be sulfated directly utilizing chlorosulfonic acid when the reaction is conducted in the presence of a primary alcohol ethoxylate or an alkylaryl ethoxylate. No solvent is required in the reaction, although a solvent can be employed if desired. The product of the reaction after neutralization is a mixture of sulfates of the primary alcohol ethoxylates and the secondary alcohol or secondary alcohol ethoxylates. Both of the sulfates contribute to the surface activity of the mixture and the mixture is useful primarily as a detergent. The presence of the straight chain secondary alcohol ethoxylate sulfate does not impair the biodegradability of the product and greatly decreases the time required for the mixture to become degraded through biological activity.

The presence of the primary alcohol ethoxylate in the sulfation mixture is critical for the progress of the sulfation reaction. A range of from about 15 to 90 mol percent or higher of primary alcohol ethoxylate may be employed. The ratio of primary alcohol ethoxylate to secondary alcohol and/or secondary alcohol ethoxylate may be varied depending on the type of final mixture of sulfated alcohols desired within the above range.

The primary alcohol ethoxylate is preferably a polyethyleneglycol alkyl ether of the formula $$R-CH_2-O-(CH_2-CH_2-O)_n-H$$

wherein R represents a member selected from the group consisting of alkyl having from 5 to 19 carbon atoms, alkenyl having from 5 to 19 carbon atoms, and hydroxyalkyl having from 5 to 19 carbon atoms, and $n$ represents an integer of from 2 to 14. It is advantageous to have the recurrent $CH_2-CH_2-O$ units represent from about 15 to 90% of the total weight of the primary alcohol ethoxylate molecule or for $n$ to have an average value of from about 3 to about 10.

It is also desirable to utilize commercially available primary alcohol ethoxylates which contain mixtures of higher alkanols of varying chain lengths which can be from natural sources such as the fatty alcohols or from synthetic sources as obtained from petroleum. The primary alcohol ethoxylates may be straight chain or branched chain. In addition to the primary alcohol ethoxylates, alkylphenol ethoxylates or alkylnaphthol ethoxylates may be employed.

It is also possible to employ mixtures of primary alcohol ethoxylates with small amounts, up to 30% of primary alcohol propyloxylates, if desired. For ordinary detergency uses, however, the propyloxylated derivatives are not as desirable.

Among the various primary alcohol ethoxylates which are utilizable in the process are the primary higher alkanol ethoxylates such as the commercial products "Alfonic 1014–4" (a mixture of $C_{10}$ to $C_{14}$ alcohols derived from petroleum containing 40% polyoxyethylene content or an average of 3 polyoxyethylene units); "Alfonic 810-6" (a mixture of $C_8$ to $C_{10}$ synthetic aliphatic alcohols containing 60% polyoxyethylene content or an average of 5.5 polyoxyethylene units); "Alfonic 1012-6" (a mixture of $C_{10}$ to $C_{12}$ synthetic aliphatic alcohols containing 60% polyoxyethylene content or an average of 5.25 polyoxyethylene units); a lauryl alcohol ethoxylated with about 3 polyoxyethylene units; polyethylene glycol alkenyl ethers, such as oleylpolyoxyethyl alcohol having about 5 polyoxyethylene units; and polyoxyethyleneglycol hydroxyalkyl ethers, such as 12-hydroxy-octadecylpolyoxyethyl alcohol having about 6 polyoxyethylene units. Among the alkylphenol ethoxylates and alkylnaphthol ethoxylates are alkylphenol ethoxylate having an average of 4 polyoxyethylene units and an average of 9 carbon atoms in the alkyl portion of the molecule.

The secondary alcohols are those having the formula $$R_1-CH-R_2$$
$$\phantom{R_1-C}\vert$$
$$\phantom{R_1-C}OH$$

wherein $R_1$ and $R_2$ are alkyl having from 1 to 18 carbon atoms and the total of the carbon atoms in $R_1$ and $R_2$ is from 5 to 19, and preferably those having the formula $$CH_3-(CH_2)_m-CH-(CH_2)_o-CH_3$$
$$\phantom{CH_3-(CH_2)_m-C}\vert$$
$$\phantom{CH_3-(CH_2)_m-C}OH$$

wherein $m$ is an integer of from 0 to 17, $o$ is an integer of from 0 to 17 and the sum of $m+o$ is an integer from 3 to 17. Preferable are straight chain secondary alcohols having from 10 to 15 carbon atoms which are commercially available. Branched chain secondary alcohols of the above formula are also utilizable, however.

The secondary alcohol ethoxylates are ethoxylates of the above secondary alcohols such as a straight chain secondary alcohol ethoxylate having from 11 to 15 carbon atoms in the alcohol moiety with an average of 4 polyoxyethylene units, and "Tergitol 15–S–3," a straight chain secondary alcohol ethoxylate having from 11 to 15 carbon atoms in the alcohol moiety with an average of 3 polyoxyethylene units.

In addition to physical mixtures of primary alcohol ethoxylates with secondary alcohols and/or secondary alcohol ethoxylates, ethoxylated mixtures of primary and secondary alcohols may also be employed advantageously. These ethoxylated mixtures can be utilized as prepared without separation of the ethoxylation by-products (polyglycols and unreacted alcohols) as the by-products also undergo sulfation and are valuable components in the final product. These ethoxylated mixtures have a considerable advantage over the use of physical mixtures of primary alcohol ethoxylates with secondary alcohols and/or secondary alcohol ethoxylates in the sulfation reaction since they are inherently less expensive to produce.

The sulfation reaction is conducted by gradually adding chlorosulfonic acid to the mixture of alcohols while agitating and cooling to maintain the temperature between about 0° C. and 50° C. From about 0.9 to about 1.25 mols of chlorosulfonic acid are employed per mol equivalent of hydroxyl groups present in the mixed alcohols. The reaction is preferably conducted while passing air or other inert gas therethrough in order to remove the HCl formed by the reaction.

The reaction is advantageously carried out by continuous methods, introducing metered amounts of the alcohol mixture and the chlorosulfonic acid into a cooled reactor. When utilizing batch processes the reaction must be conducted over a period of time of from 5 to 60 minutes, depending on the rate of addition of the chlorosulfonic acid and the rate of cooling of the reaction mass.

The temperature of the reaction is preferably maintained below 50° C. As the temperature of the reaction increases substantially above about 35° C., some by-products are formed decreasing the degree of sulfation of the mixed alcohols. If local overheating is avoided, temperatures up to the upper limit or higher can be employed without substantially lowering the reaction yield. At lower temperatures, the time of reaction is longer.

The reaction is finished by neutralization of the reaction mixture with an aqueous or an aqueous lower alkanolic solution of an alkalizing agent selected from the group consisting of ammonia, alkali metal hydroxides and amines. Preferably, neutralization is made with ammonia in a concentrated aqueous ethanolic solution (20% to 50% solution of about equal amounts of water and ethanol) or a concentrated sodium hydroxide solution (20% to 50% aqueous solution).

If an amine is utilized in the neutralization step, a lower alkyl amine such as methylamine, trimethylamine, ethylamine, diethylamine and triethylamine or a polyamine, such as diethylene triamine and ethylene diamine can be utilized. However, preferred are alkanol amines and alkanol polyamines, such as diethanolamine, triethanolamine, ethoxylated amines, propyloxylated amines, ethoxylated polyamines, etc.

The reaction mixture after neutralization may be employed as such for detergent usages without other separation steps.

The products of the reaction contain at least 80% of starting alcohol groups in the form of sulfates. Degrees of sulfation of 95% or higher are readily obtained. By direct sulfation of secondary alcohols with chlorosulfonic acid, it is impossible to obtain commercially acceptable products with a degree of sulfation of over 80% and direct sulfation of secondary alcohol ethoxylates with chlorosulfonic acid can only be conducted at very low temperatures, 10° C. or less, over long periods of time, to give products having sulfation degrees in excess of 80%.

The ethoxylated mixtures of primary and secondary alcohols are prepared by reacting from about 2 to about 17 mols of ethylene oxide with about one mol of a mixture of (1) from about 0.15 to about 0.9 mol equivalents of a primary alkanol having from 6 to 20 carbon atoms and (2) from about 0.1 to about 0.85 mol equivalents of a secondary alkanol of the formula

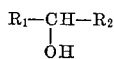

wherein $R_1$ and $R_2$ are alkyl having from 1 to 18 carbon atoms and the total of the carbon atoms in $R_1$ and $R_2$ is from 5 to 19, under the customary ethoxylation conditions and recovering the ethoxylated mixture by customary procedures.

As indicated previously, it is advantageous to utilize the entire ethoxylation mixture without any attempt to separate the unreacted alcohols or the small amount of by-product polyglycols formed as the same undergo the sulfation reaction. If it is desired to separate the mixed ethoxylated alcohols, this can be accomplished by the usual procedures.

The reaction is conducted under the customary ethoxylation conditions as known in the art, utilizing ethoxylation catalysts and ethoxylation temperatures. As an unexpected advantage however, it was found that if the ethoxylation reaction was conducted in the presence of an acidic ethoxylation catalyst such as boron trifluoride or its complexes at temperatures below the ambient temperature and preferably at temperatures between about 5° C. and 15° C., the ethoxylation reaction continued to substantial completion when mixed alcohols were employed. When ethoxylating a secondary alcohol, it is customary to ethoxylate first with an acidic ethoxylation catalyst and thereafter, as a second step, to ethoxylate with a basic ethoxylation catalyst in order to obtain substantially complete etherification of the starting alcohols.

As starting primary alcohols, there can be employed alcohols of the formula

wherein R represents a member selected from the group consisting of alkyl having from 5 to 19 carbon atoms, alkenyl having from 5 to 19 carbon atoms, and hydroxyalkyl having from 5 to 19 carbon atoms.

Any primary alkanol containing from 6 to 20 carbon atoms may be employed. These can be either straight or branched chain in the alkyl portion although the straight chain alkanols are preferable from the viewpoint of biodegradability of the final sulfated product. The primary alkanols can also be derived by synthesis and can be a mixture of alkanols as obtained from the hydrogenation of natural fats or from synthetic processes. Among such primary alkanols are "Alfol C10–C14" (a mixture of $C_{10}$ to $C_{14}$ primary alkanols derived from petroleum), lauryl alcohol, stearyl alcohol, coconut fatty alcohols derived by the hydrogenation of coconut oil, etc. It is also possible to utilize unsaturated and hydroxylated primary alcohols such as oleyl alcohol and 12-hydroxy-octadecyl alcohol.

As starting secondary alcohols, there can be employed any of the previously listed secondary alcohols.

If the mixed alcohol ethoxylate is employed, without removal of the by-products, as outlined above, the resulting mixture contains about 0.5% to 1% of polyglycols and from about 10% to 20% of unreacted alcohols. When this mixture is sulfated according to the invention, extremely stable sulfated products are obtained which do not undergo detectable hydrolysis even when solutions of the same were subjected to temperatures of 60° C. for several weeks.

The following examples are illustrative of the process of the process of the invention. However, they are not to be construed as limitative in any respect.

Example I 165 gm. (0.5 mols) of a primary alcohol ethoxylate containing from 10 to 14 carbon atoms in the alcohol moiety and an average of 3 oxyethylene units ("Alfonic 1014–4") (M.W. 330) and 95 gm. (0.5 mol) of a secondary straight chain aliphatic alcohol having from 10 to 13 carbon atoms and an average molecular weight of 190 were mixed together. To this mixture 120 gm. (about 1.03 mols) of anhydrous chlorosulfonic acid were gradually added while agitating the mixture and passing air therethrough. The reaction temperature was maintained at from 20° C. to 25° C. by cooling. On completion of the addition of the chlorosulfonic acid, a dark amber viscous liquid was formed.

The reaction product was then neutralized by a mixture consisting of 95 gm. of 28% aqueous ammonia solution, 60 gm. of ethyl alcohol and 90 gm. of water. A yellow, free-flowing liquid was obtained.

This product consisted of 53.5% alcohol sulfates and 4.3% unsulfated alcohols. The starting alcohols were 90.0% sulfated (90.0% sulfation degree). A 10% solution of the product had a pH of 7.4.

Example II

Example I was repeated except that 130 gm. (1.11 mols) of chlorosulfonic acid were utilized. The reaction conditions were maintained the same.

After neutralization the product was similar in appearance with the product of Example I. The product had the following analysis:

Alcohol sulfates _____percent__ 59.0
Unsulfated alcohols _____percent__ 2.4
pH—10% solution _____ 7.4
The starting alcohols were 94.7% sulfated.

Example III 110 gm. (0.33 mol) of "Alfonic 1014–4" and 130 gm. (0.67 mol) of a secondary straight chain aliphatic alcohol having from 10 to 13 carbon atoms and an average molecular weight of 190 were mixed together. To this mixture, 130 gm. (about 1.11 mols) of anhydrous chlorosulfonic acid were gradually added under the same conditions as in Example I, except the reaction temperature was maintained at 25° C. to 35° C.

After neutralization as in Example I, the product was similar in appearance with the product of Example I and had the following analysis:

Alcohol sulfates _____percent__ 53.5
Unsulfated alcohols _____percent__ 6.9
pH—10% solution _____ 8.4
The starting alcohols were 87.2% sulfated.

Example IV 66 gm. (0.2 mol) of "Alfonic 1014–4" and 153 gm. (0.8 mol) of a secondary straight chain aliphatic alcohol having from 10 to 13 carbon atoms and an average molecular weight of 190 were mixed together. To this mixture, 130 gm. (about 1.11 mols) of anhydrous chlorosulfonic acid were gradually added under the same conditions as in Example I.

After neutralization, as in Example I, the product was similar in appearance with the product of Example I, except that it showed turbidity, and had the following analysis:

Alcohol sulfates _____percent__ 46.9
Unsulfated alcohols _____percent__ 7.3
pH—10% solution _____ 7.0
The starting alcohols were 81.8% sulfated.

Example V 33 gm. (0.1 mol) of "Alfonic 1014–4" and 172 gm. (0.9 mol) of a secondary straight chain aliphatic alcohol having from 10 to 13 carbon atoms and an average molecular weight of 190 were mixed together. To this mixture, 130 gm. (about 1.11 mols) of anhydrous chlorosulfnic acid were gradually added under the same conditions as in Example I.

The reaction product was neutralized by a mixture of 100 gm. of a 50% NaOH solution and 500 gm. of water. After neutralization, a cloudy material was obtained which separated on standing. The product obtained had a sulfation degree of 60.4%.

This example demonstrates the criticality of maintaining at least a 0.15 mol amount of primary alcohol ethoxylate in the sulfation mixture.

Example VI 164.5 gm. (0.5 mol) of "Alfonic 1014–4" and 93 gm. (0.5 mol) of 2,6,8-trimethyl-4-nonanol having the formula

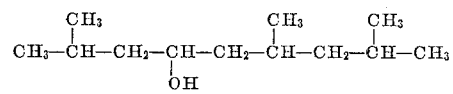

were mixed together. To this mixture 130 gm. (about 1.11 mols) of anhydrous chlorosulfonic acid were gradually added under the same conditions as in Example I, except that the reaction temperature was maintained between 17° C. and 21° C.

The reaction product was neutralized with a mixture of 100 gm. of 28% aqueous ammonia, 60 gm. of ethyl alcohol and 55 gm. of water. After neutralization a yellow, free-flowing liquid was obtained which had the following analysis:

Alcohol sulfates _____percent__ 55.5
Unsulfated alcohols _____percent__ 5.1
pH—10% solution _____ 7.0
The starting alcohols were 88.7% sulfated.

Example VII 164.5 gm. (0.5 mol) of "Alfonic 1014–4" and 72 gm. (0.5 mol) of di-isobutyl carbinol having the formula

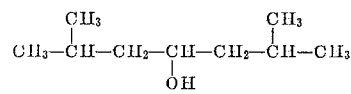

were mixed together. To this mixture 130 gm. (about 1.11 mols) of anhydrous chlorosulfonic acid were gradually added under the same conditions as in Example I, except that the reaction temperature was maintained between 17° C. and 22° C.

The reaction product was neutralized with a mixture of 100 gm. of 28% aqueous ammonia, 55 gm. of ethyl alcohol and 55 gm. of water. After neutralization a clear, free-flowing yellow liquid was obtained having the following analysis:

Alcohol sulfates _____percent__ 53.9
Unsulfated alcohols _____percent__ 3.9
pH—10% solution _____ 7.0
The starting alcohols were 90.7% sulfated.

Example VIII 165 gm. (0.5 mol) of a primary alcohol ethoxylate containing from 10 to 14 carbon atoms in the alcohol moiety and an average of 3 oxyethylene units ("Alfonic 1014–4") (M.W. 330) and 172 gm. (0.5 mol) of a secondary straight chain alcohol ethoxylate containing from 10 to 13 carbon atoms in the aliphatic carbon chain of the alcohol moiety and an average of 3.5 oxyethylene units (M.W. 344) were mixed together. To this mixture 130 gm. (about 1.11 mols) of anhydrous chlorosulfonic acid were gradually added while agitating the mixture and passing air therethrough. The reaction temperature was maintained at from 15° C. to 20° C. on cooling. On completion of the addition of the chlorosulfonic acid, a dark amber, viscous product was formed.

The reaction product was then neutralized by a mixture consisting of about 100 parts of 28% aqueous ammonia solution, 55 parts ethyl alcohol and 60 parts of water. A light yellow, free-flowing liquid was obtained.

The product analyzed 60.7% alcohol sulfates and 2.9% unsulfated alcohols. The starting alcohols were 94.3% sulfated (94.3% sulfation degree). A 10% solution of the product had a pH of 7.3.

Example IX

To determine the effect of the temperature of the reaction, 0.25 mol of a primary alcohol ethoxylate "Alfonic 1014–4" and 0.25 mol of a secondary straight chain alcohol ethoxylate containing from 10 to 13 carbon atoms in the aliphatic carbon chain of the alcohol moiety and an average of 3 oxyethylene units were mixed together and reacted with 65 gm. (0.55 mol) of anhydrous chlorosulfonic acid while agitating thoroughly and passing air therethrough.

Four different batches were reacted at the following temperatures:

|   | ° C. |
|---|---|
| A | 15–18 |
| B | 20–25 |
| C | 25–30 |
| D | 30–35 |

Each of the reaction mixtures was neutralized with a mixture of 45 gm. of a 28% aqueous ammonia solution, 35 gm. of ethyl alcohol and 35 gm. of water and analyzed with the following results.

TABLE I

| Batch | A | B | C | D |
|---|---|---|---|---|
| Sulfation temperature, °C | 15-18 | 20-25 | 25-30 | 30-35 |
| pH of a 10% solution | 7.3 | 7.2 | 6.4 | 8.7 |
| Percent alcohol sulfate | 59.3 | 60.9 | 57.9 | 55.0 |
| Percent unsulfated alcohol | 2.9 | 2.1 | 3.5 | 5.3 |
| Percent sulfation degree | 94.0 | 95.7 | 92.7 | 88.8 |

Example X 110 gm. (0.33 mol) of primary alcohol ethoxylate "Alfonic 1014-4" and 218 gm. (0.66 mol) of a secondary straight chain alcohol ethoxylate having from 11 to 15 carbon atoms in the alcohol moiety with an average of 3 oxyethylene units ("Tergitol 15-S-3") were mixed and reacted with 130 gm. (1.11 mols) of anhydrous chlorosulfonic acid at a temperature of 19° C. to 23° C. under the reaction conditions of Example VIII.

The reaction product was neutralized with a mixture of 104 gm. of a 28% aqueous ammonia solution, 90 gm. of ethyl alcohol and 90 gm. of water. A golden yellow, free-flowing liquid was obtained. The product had the following analysis:

| | |
|---|---|
| pH of a 10% solution | 7.4 |
| Alcohol sulfate percent | 52.3 |
| Unsulfated alcohol percent | 5.4 |
| Sulfation degree percent | 88.1 |

Example XI

Example X was repeated at varying sulfation temperatures with the following results:

TABLE II

| Batch | A | B | C |
|---|---|---|---|
| Sulfation temperature, °C | 15-20 | 20-25 | 25-30 |
| pH of a 10% solution | 7.1 | 7.6 | 7.5 |
| Percent alcohol sulfate | 58.1 | 56.4 | 51.8 |
| Percent unsulfated alcohol | 3.2 | 4.3 | 5.7 |
| Percent sulfation degree | 93.3 | 90.0 | 87.4 |

Example XII

Example VIII was repeated using 0.5 mol of a natural lauryl alcohol, "Lorol 5," ethoxylated with an average of 3 oxyethylene units as the primary alcohol ethoxylate. The sulfated product was neutralized with a mixture consisting of 100 gm. of 28% aqueous ammonia solution, 70 gm. of ethyl alcohol and 70 gm. of water. A yellow, free-flowing liquid was obtained with the following analysis:

| | |
|---|---|
| pH of a 10% solution | 8.5 |
| Alcohol sulfate percent | 54.6 |
| Unsulfated alcohol percent | 3.3 |
| Sulfation degree percent | 92.7 |

Example XIII 218 gm. (0.5 mol) of "Sterox," an alkylphenol ethoxylate having an average of 4 polyoxyethylene units and an average of 9 carbon atoms in the alkyl portion of the molecule, and 0.5 mol of a secondary straight chain alcohol ethoxylate containing 12 to 15 carbon atoms and 3 oxyethylene units were mixed together. To this mixture 130 gm. (about 1.11 mols) of anhydrous chlorosulfonic acid were gradually added under the same conditions as in Example VIII, except that the reaction temperature was maintained between 18° C. and 21° C.

The reaction product was neutralized with a mixture consisting of 100 gm. of 28% aqueous ammonia, 75 gm. of ethyl alcohol and 75 gm. of water. After neutralization a yellow, free-flowing liquid was obtained having the following analysis:

| | |
|---|---|
| Alcohol sulfates percent | 59.2 |
| Unsulfated alcohols percent | 5.24 |
| pH—10% solution | 7.7 |

The starting alcohols were 90.0% sulfated.

Example XIV

A mixture of 154.5 gm. (0.5 mol) of a secondary straight chain alcohol ethoxylate containing 10 to 13 carbon atoms and 3 oxyethylene units, 164.5 gm. (0.5 mol) of "Alfonic 1014-4" and 37 gm. of diethylether were reacted with 130 gm. (1.11 mols) of anhydrous chlorosulfonic acid at a temperature of 8° C. to 11° C. under the conditions of Example VIII. The sulfated mixture was neutralized with a mixture of 100 gm. of a 50% NaOH solution and 800 gm. of water and the diethylether was removed by distillation. A pale yellow liquid remained which analyzed:

| | |
|---|---|
| pH of a 10% solution | 9.4 |
| Alcohol sulfate percent | 28.5 |
| Unsulfated alcohol percent | 0.7 |
| Sulfation degree percent | 96.8 |

Example XV

A mixture of 0.5 mol of "Alfonic 1014-4," 0.5 mol of a secondary straight chain alcohol ethoxylate containing 12 to 15 carbon atoms and 3 oxyethylene units and 100 gm. (0.25 mol) of a polyoxyethylene glycol having an average molecular weight of 400 were reacted with 1.1 mols of anhydrous chlorosulfonic acid at a temperature of 12° C. to 17° C. under the conditions of Example VIII. The sulfated mixture was neutralized with a mixture of 100 gm. of 28% aqueous ammonia solution, 70 gm. of ethyl alcohol and 70 gm. of water. A yellow, free-flowing liquid was obtained which analyzed:

| | |
|---|---|
| pH of a 10% solution | 7.6 |
| Alcohol sulfate percent | 48.7 |
| Unsulfated alcohol percent | 7.8 |
| Sulfation degree percent | 82.8 |

Example XVI 132 gm. (0.4 mol) of "Alfonic 1014-4" and 180 gm. (0.4 mol) of a branched chain secondary alcohol ethoxylate of 2,6,8-trimethyl-4-nonanol having an average of 6 oxyethylene units ("Tergitol TMN") were mixed together. To this mixture 103 gm. (about 0.88 mol) of anhydrous chlorosulfonic acid were gradually added under the same conditions as in Example VIII, except that the reaction temperature was maintained between 17° C. and 21° C.

The reaction product was neutralized with a mixture of 80 gm. of 28% aqueous ammonia, 65 gm. of ethyl alcohol and 50 gm. of water. After neutralization a yellow, free-flowing liquid was obtained which had the following analysis:

| | |
|---|---|
| Alcohol sulfates percent | 58.5 |
| Unsulfated alcohols percent | 8.8 |
| pH—10% solution | 8.5 |

The starting alcohols were 84.1% sulfated.

Example XVII 161.5 gm. (0.5 mol) of a branched chain primary alkanol ethoxylate having an average of 13 carbon atoms in the alkanol portion of the molecule and an average of 3 oxyethylene units ("Lipal 3TD") and 156 gm. (0.5 mol) of a secondary straight chain alcohol ethoxylate having from 12 to 15 carbon atoms in the alcohol moiety with an average of 3 oxyethylene units were mixed and reacted with 130 gm. (1.11 mols) of anhydrous chlorosulfonic acid at a temperature of 15° C. to 20° C. under the reaction conditions of Example VIII.

The reaction product was neutralized with a mixture of 110 gm. of a 28% aqueous ammonia solution, 70 gm. of ethyl alcohol and 70 gm. of water. A yellow, free-flowing liquid was obtained. The product had the following analysis:

| | |
|---|---|
| pH of a 10% solution | 7.3 |
| Alcohol sulfate percent | 55.2 |
| Unsulfated alcohol percent | 2.5 |
| Sulfation degree percent | 94.3 |

Example XVIII 161.5 gm. (0.5 mol) of "Lipal 3TD" and 95.5 gm. (0.5 mol) of a secondary straight chain aliphatic alcohol having from 10 to 13 carbon atoms and an average molecular weight of 190 were mixed together. To this mixture 130 gm. (about 1.11 mols) of anhydrous chlorosulfonic acid were gradually added while agitating the mixture and passing air therethrough. The reaction temperature was maintained at from 15° C. to 20° C. by cooling. On completion of the addition of the chlorosulfonic acid, a dark amber viscous liquid was formed.

The reaction product was then neutralized by a mixture consisting of 100 gm. of 28% aqueous ammonia solution, 60 gm. of ethyl alcohol and 60 gm. of water. A yellow, free-flowing liquid was obtained.

This product consisted of 54.4% alcohol sulfates and 2.8% unsulfated alcohols. The starting alcohols were 93.3% sulfated (93.3% sulfation degree). A 10% solution of the product had a pH of 8.3.

Example XIX.—Ethoxylation of mixed alcohols 1 mol of a commercial secondary alkanol having from 12 to 15 carbon atoms and an average molecular weight of 201 and 1 mol of a commercial primary fatty alcohol having from 10 to 14 carbon atoms and an average molecular weight of 183 were mixed, then ethoxylated using boron trifluoride as a catalyst. The temperature was maintained at from 5° C. to 15° C. during the ethoxylation and 3 mols of ethylene oxide were added per mol equivalent of the alcohol mixture. The unreacted alcohol was not removed from the ethoxylation mixture. The mixed ethoxylated product was a colorless material having the following analysis:

| | |
|---|---|
| Hydroxyl number | 171.3 |
| Saponification number | 1 |
| Iodine number | 0.9 |
| Acid number | 0 |
| Water, percent | 0.19 |
| Polyglycol, percent | 0.49 |
| Unreacted alcohols, percent | 10–20 |

The mixed ethoxylated alcohols having ethoxylation by-products and unreacted alcohols is a novel product of commerce.

Example XX 2 mol equivalents of the mixed ethoxylated alcohols of Example XIX (as determined by the Hydroxyl Number) were placed in the reaction vessel. 2.06 mols of anhydrous chlorosulfonic acid were gradually added while agitating the mixture and passing air therethrough. The reaction temperature was maintained at from 20° C. to 25° C. by cooling.

The reaction product was split in half and each moiety was neutralized.

The first moiety was neutralized by a mixture consisting of 95 gm. of 28% aqueous ammonia solution, 60 gm. of ethyl alcohol and 90 gm. of water. A clear yellow liquid was obtained containing approximately 60% alcohol sulfates.

The second moiety was neutralized by a mixture of 100 gm. of a 50% NaOH solution and 500 gm. of water. A clear yellow liquid was obtained containing approximately 40% alcohol sulfates.

Both neutralized products were 92.2% sulfated. These alcohol ether sulfate mixtures were compared with primary alcohol ether sulfates. No significant differences were detected in the evaluation between the sodium salt and the ammonium salt. Substitution of these mixed alcohol ether sulfates in dishwashing compounds for straight primary ether sulfates showed that the performance was as good as a straight alcohol ether sulfate in normal waters. Flash foaming application was another area where substitution could be made. The same result was obtained in the surface tension of deionized water. Soft water foam stability for the mixed alcohol ether sulfates was as good as in the Ross-Miles evaluation or in the presence of food salts. Cotton detergency of unbuilt mixed alcohol ether sulfates gave the same results as for primary fatty alcohol ether sulfates. The same result was obtained in built systems.

The mixed alcohol ether sulfates of the invention, without having removed the unethoxylated primary and secondary alcohols after sulfation, produced very stable compounds. Stability tests were run at room temperature and at the temperature of 60° C. for several weeks. No change in pH was observed in spite of the presence of unethoxylated secondary alcohol sulfates, which are known to hydroylze very easily on standing at room temperature.

The preceding specific embodiments are illustrative of the invention. It is obvious, however, that other expedients known to those skilled in the art may be employed without departing from the spirit of the invention or the scope of the appended claims.

We claim:

1. A process of direct sulfation which comprises the steps of reacting a mixture of (1) from about 0.15 to about 0.9 mol equivalents of an alcohol selected from the group consisting of a polyethylene glycol alkyl ether of the formula

$$R-CH_2-O-(CH_2-CH_2-O)_n-H$$

wherein R represents a member selected from the group consisting of alkyl having from 5 to 19 carbon atoms, alkenyl having from 5 to 19 carbon atoms, and hydroxyalkyl having from 5 to 19 carbon atoms and $n$ represents an integer of from 2 to 17 and a polyethylene glycol alkylaryl ether of the formula

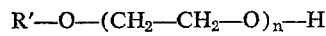

$$R'-O-(CH_2-CH_2-O)_n-H$$

wherein R' represents alkylaryl having from 7 to 24 carbon atoms and $n$ represents an integer from 2 to 17, and (2) from about 0.1 to about 0.85 mol equivalents of an alcohol selected from the group consisting of alcohols of the formula

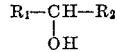

$$\underset{\underset{OH}{|}}{R_1-CH-R_2}$$

wherein $R_1$ and $R_2$ are alkyl having from 1 to 18 carbon atoms and the total of the carbon atoms in $R_1$ and $R_2$ is from 5 to 19, and secondary alcohol ethoxylates of the formula

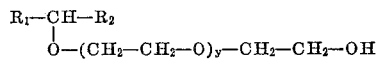

$$\underset{\underset{O-(CH_2-CH_2-O)_y-CH_2-CH_2-OH}{|}}{R_1-CH-R_2}$$

wherein $R_1$ and $R_2$ are alkyl having from 1 to 18 carbon atoms and the total of the carbon atoms in $R_1$ and $R_2$ is from 5 to 19, and $y$ is an integer of from 0 to 20, with from about 0.9 to about 1.25 mol equivalents per hydroxyl groups of anhydrous chlorosulfonic acid, at a temperature of from about 0° C. to about 50° C., and recovering a mixture of sulfated alcohols having a sulfation degree of at least 80%.

2. The process of claim 1 wherein the sulfated alcohols are neutralized with an alkali selected from the group consisting of ammonia, alkali metal hydroxides, alkyl amines, alkanol amines, propyloxylated amines, ethoxylated amines, polyamines and ethoxylated polyamines, before the recovery step.

3. The process of claim 1 wherein an inert gas is passed through said reaction mixture to remove the hydrogen chloride produced by the reaction.

4. A process for the production of a mixture of sulfonated alcohols having a sulfation degree of at least 80% which consists of the steps of reacting from about 0.9 to about 1.25 mol equivalents per hydroxyl group of anhydrous chlorosulfonic acid with a mixture of (1) from about 0.15 to about 0.9 mol equivalents of a polyethylene glycol alkyl ether of the formula.

$$CH_3(CH_2)_x-CH_2-O-(CH_2CH_2O)_n-H$$

wherein $x$ represents an integer of from 4 to 18 and $n$ represents an integer of from 2 to 17 and (2) from about 0.1 to 0.85 mol equivalents of a secondary alcohol ethoxylate of the formula $$CH_3-(CH_2)_m-CH-(CH_2)_o-CH_3$$
$$|$$
$$O-(CH_2-CH_2O)_n-H$$

wherein $m$ is an integer of from 0 to 15, $o$ is an integer of from 0 to 15 and the sum of $m+o$ is an integer of from 5 to 15, and $n$ is an integer of from 2 to 17, at a temperature of from about 0° C. to about 50° C., neutralizing said reaction product with an aqueous solution of an alkali selected from the group consisting of ammonia, alkali metal hydroxides, alkyl amines, polyamines, alkanol amines, and alkanol polyamines, and recovering neutralized mixed sulfated alcohols having a sulfation degree of at least 80%.

5. The process of claim 4 wherein said alcohols are straight chain alcohols.

6. The process of claim 4 wherein an inert gas is passed through said reaction mixture to remove the hydrogen chloride produced by the reaction.

7. A process for the production of a mixture of sulfated alcohols having a sulfation degree of at least 80% which consists of the steps of reacting from about 0.9 to about 1.25 mol equivalents per hydroxyl group of anhydrous chlorosulfonic acid with a mixture of (1) from about 0.15 to about 0.9 mol equivalents of a polyethylene glycol alkylaryl ether of the formula $$R'-O-(CH_2-CH_2-O)_n-H$$

wherein R' represents alkylaryl having from 7 to 24 carbon atoms and $n$ represents an integer from 2 to 17, and (2) from about 0.1 to 0.85 mol equivalents of an alcohol selected from the group consisting of alcohols of the formula $$R_1-CH-R_2$$
$$|$$
$$OH$$

wherein $R_1$ and $R_2$ are alkyl having from 1 to 18 carbon atoms and the total of the carbon atoms in $R_1$ and $R_2$ is from 5 to 19, and secondary alcohol ethoxylates of the formula $$R_1-CH-R_2$$
$$|$$
$$O-(CH_2-CH_2-O)_y-CH_2-CH_2-OH$$

wherein $R_1$ and $R_2$ are alkyl having from 1 to 18 carbon atoms and the total of the carbon atoms in $R_1$ and $R_2$ is from 5 to 19, and $y$ is an integer of from 0 to 20, at a temperature of from about 0° C. to about 50° C., neutralizing said reaction product with an aqueous solution of an alkali selected from the group consisting of ammonia, alkali metal hydroxides, alkyl amines, polyamines, alkanol amines, and alkanol polyamines, and recovering neutralized mixed sulfated alcohols having a sulfation degree of at least 80%.

8. The process of claim 7 wherein an inert gas is passed through said reaction mixture to remove the hydrogen chloride produced by the reaction.

9. A process for the production of a mixture of sulfated alcohols having a sulfation degree of at least 80% which consists of the steps of reacting from about 0.9 to about 1.25 mol equivalents per hydroxyl group of anhydrous chlorosulfonic acid with a mixture of (1) from about 0.15 to about 0.9 mol equivalents of a polyethylene glycol alkyl ether of the formula $$CH_3(CH_2)_x-CH_2-O-(CH_2CH_2O)_n-H$$

wherein $x$ represents an integer of from 4 to 18 and $n$ represents an integer of from 2 to 17, and (2) from about 0.1 to 0.85 mol equivalents of an alcohol selected from the group consisting of alcohols of the formula $$R_1-CH-R_2$$
$$|$$
$$OH$$

wherein $R_1$ and $R_2$ are alkyl having from 1 to 18 carbon atoms and the total of the carbon atoms in $R_1$ and $R_2$ is from 5 to 19, and secondary alcohol ethoxylates of the formula $$R_1-CH-R_2$$
$$|$$
$$O-(CH_2-CH_2-O)_y-CH_2-CH_2-OH$$

wherein $R_1$ and $R_2$ are alkyl having from 1 to 18 carbon atoms and the total of the carbon atoms in $R_1$ and $R_2$ is from 5 to 19, and $y$ is an integer of from 0 to 20, at a temperature of from about 0° C. to about 50° C., neutralizing said reaction product with an aqueous solution of an alkali selected from the group consisting of ammonia, alkali metal hydroxides, alkyl amines, polyamines, alkanol amines, and alkanol polymines, and recovering neutralized mixed sulfated alcohols having a sulfation degree of at least 80%.

10. The process of claim 9 wherein an inert gas is passed through said reaction mixture to remove the hydrogen chloride produced by the reaction.

11. The process of claim 9 wherein $R_1$ and $R_2$ represent branched chain alkyl.

References Cited

UNITED STATES PATENTS

| | | | |
|---|---|---|---|
| 2,174,761 | 10/1939 | Schuette et al. | 260—458 |
| 2,203,883 | 6/1940 | Steindorff et al. | 260—457 |
| 2,229,649 | 1/1941 | Guenther et al. | 260—459 |
| 2,320,181 | 5/1943 | Hentrich et al. | 260—458 |
| 2,327,053 | 8/1943 | Marple et al. | 260—611 |
| 2,647,913 | 8/1953 | Kosmin | 260—458 |
| 3,054,820 | 9/1962 | Martin de Jong et al. | 260—458 |

CHARLES B. PARKER, *Primary Examiner.*

L. C. MARUZO, *Assistant Examiner.*